(12) United States Patent
Goto

(10) Patent No.: US 6,545,692 B1
(45) Date of Patent: *Apr. 8, 2003

(54) DIGITAL COLOR IMAGE FORMING APPARATUS HAVING A RECORDING ELEMENT COMPRISED OF A LIGHT EMITTING ARRAY

(75) Inventor: Tatsuya Goto, Numazu (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/889,500

(22) Filed: Jul. 8, 1997

(30) Foreign Application Priority Data

Jul. 11, 1996 (JP) .............................. 8-182045

(51) Int. Cl.[7] ................................ B41J 2/385
(52) U.S. Cl. ...................................... 347/118; 347/130
(58) Field of Search ................................ 347/118, 130, 347/131, 132, 240, 237, 238, 185, 186; 399/6, 4, 186, 299; 358/298

(56) References Cited

U.S. PATENT DOCUMENTS

| | | | | |
|---|---|---|---|---|
| 4,365,275 A | * | 12/1982 | Berman et al. .......... | 358/298 X |
| 4,536,778 A | * | 8/1985 | De Schamphelaere et al. | .. 347/130 |
| 4,734,734 A | * | 3/1988 | Yano ........................... | 347/130 |
| 4,839,672 A | * | 6/1989 | Reinten ....................... | 347/238 |
| 4,903,067 A | * | 2/1990 | Murayama et al. ..... | 347/118 X |
| 4,916,489 A | * | 4/1990 | Takeda et al. | |
| 5,371,578 A | * | 12/1994 | Asano et al. ............... | 399/100 |
| 5,506,671 A | * | 4/1996 | Buts et al. .................... | 399/39 |
| 5,923,355 A | * | 7/1999 | Fujita et al. ................. | 347/131 |

FOREIGN PATENT DOCUMENTS

| | | | |
|---|---|---|---|
| EP | 0 132 794 | | 2/1985 |
| JP | 10016293 | * | 1/1988 |
| JP | 01222274 | * | 9/1989 |
| JP | 7-13395 | * | 1/1995 ......... G03G/15/00 |
| WO | WO 95/01044 | | 1/1995 |

* cited by examiner

Primary Examiner—Thinh Nguyen
(74) Attorney, Agent, or Firm—Fitzpatrick, Cella, Harper & Scinto

(57) ABSTRACT

An image forming apparatus for forming an image on a recording material includes a photosensitive member, an array of light emitting elements for exposing the photosensitive member in accordance with an image information, and a developer for developing pixels exposed by the ray of light emitting elements, wherein the array of light emitting elements further emit a light during a time period other than a time period during which the array of light emitting elements emits a light in accordance with the image information.

5 Claims, 8 Drawing Sheets

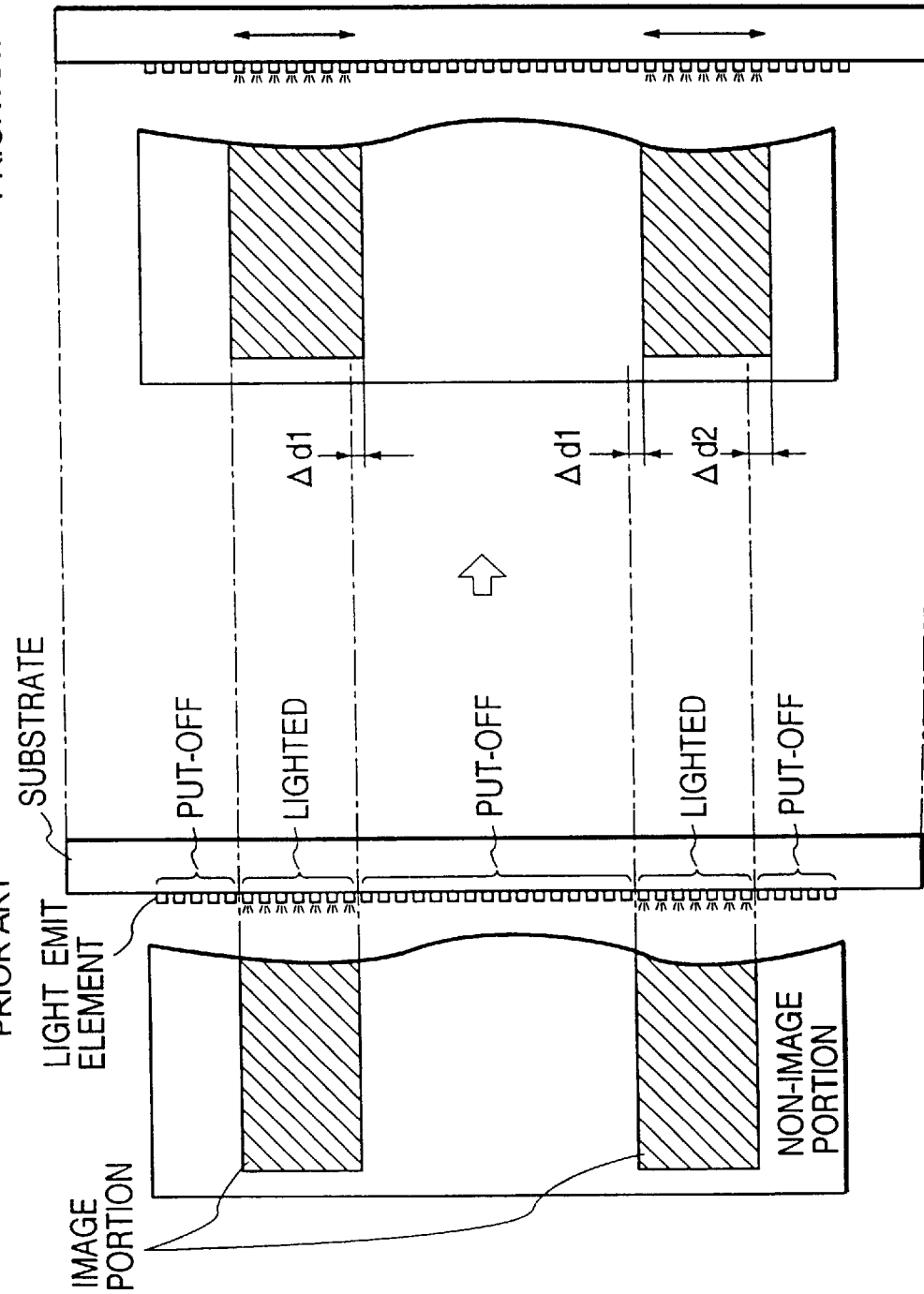

DIGITAL COLOR IMAGE FORMING APPARATUS HAVING A RECORDING ELEMENT COMPRISED OF A LIGHT EMITTING ARRAY

BACKGROUND OF THE INVENTION

1. Field of the Invention

The present invention relates to a digital color image forming apparatus having a light emitting element array as a recording means.

2. Related Background Art

In conventional color copying machines having such a recording means and latent image forming means (for example, an yellow developing device, a magenta developing device, a cyan developing device, a black developing device, a photosensitive member and the like), recording heads and latent image forming means are spaced apart from each other side by side on an upper surface of a belt-shaped transfer medium, a recording sheet fed from a sheet supply portion is conveyed by the transfer medium, and toner images formed on the photosensitive member are successively transferred onto the recording sheet, to thereby form a color image. As shown in FIGS. 6A to 6C, in the recording head, LED (light emitting element) array chips and their drive IC ships are mounted on a single substrate, and the LED array chips and the corresponding drive IC chips are interconnected by wire bonding. Heat generated by the LED array chips and the drive IC chips is radiated through radiate plates shown in FIG. 6C. The recording head comprises the LED array chips, the drive IC chips and a connector. The LED array chip includes light emitting portions arranged in a line, and each light emitting portion has a wiring pad for connecting to the drive IC chip. The drive IC chip also has wiring pads corresponding to the respective light emitting portions. By controlling emission of light, the light emitting portions can be controlled. The LED array chip and the drive IC chip are generally interconnected by wire bonding.

However, in the above-mentioned conventional technique, the recording head is expanded entirely or partially due to thermal expansion caused by heat generated from the LED array chips and/or the drive IC chips, so that the magnification in a main scan direction is changed or color deviation occurs. Further, light emitting amounts of the LED array chips are fluctuated to thereby cause temperature fluctuation and/or density unevenness which result in poor image. Particularly, if images having local high density area(s) are continuously formed, local temperature increase will occur, to thereby cause color deviation and/or density unevenness.

Further, for example, if a full-color image is formed immediately after black images were continuously formed, since temperature of only the black recording head of the image forming means was increased, significant color deviation will occur because of difference in expansion between the recording heads.

In the conventional techniques, in order to minimize the influence of the temperature difference, the substrate is formed from expensive material having low coefficient of thermal expansion or large radiate plates are used, to resultantly make the entire apparatus expensive and bulky.

SUMMARY OF THE INVENTION

The present invention intends to eliminate the above-mentioned conventional drawbacks, and has an object to provide an image forming apparatus in which an image can be formed without color deviation.

Another object of the present invention is to provide an image forming apparatus comprising a photosensitive member, an exposure means for exposing the photosensitive member with light corresponding to image information and having a plurality of light emitting elements arranged along a direction perpendicular to a conveying direction of a recording material, a transfer means for transferring an image formed on the photosensitive member onto the recording material, and a light emission controlling means for causing the plurality of light emitting elements to emit light other than a period during which the plurality of light emitting elements emit the light in response to the image information.

A further object of the present invention is to provide an image forming apparatus comprising a photosensitive member, an exposure means for exposing the photosensitive member with light corresponding to image information and having a plurality of light emitting elements arranged along a direction perpendicular to a conveying direction of a recording material, a transfer means for transferring an image formed on the photosensitive member onto the recording material, and a light emission controlling means for controlling light emission of the light emitting elements in a non-image forming period, in accordance with light emitting times of the light emitting elements emitting the light in response to the image information.

A still further object of the present invention is to provide an image forming apparatus comprising a photosensitive member, an exposure means for exposing the photosensitive member with light corresponding to image information and having a plurality of light emitting elements arranged along a direction perpendicular to a conveying direction of a recording material, a transfer means for transferring an image formed on the photosensitive member onto the recording material. When the light emitting elements corresponding to the image information emit the light, the other light emitting elements not relating to the image information also emit the light slightly.

The other objects of the present invention will be apparent from the following detailed explanation referring to the accompanying drawings.

BRIEF DESCRIPTION OF THE DRAWINGS

FIGS. 7A and 7B are explanatory views showing lighted condition of conventional light emitting elements.

DETAILED DESCRIPTION OF THE PREFERRED EMBODIMENTS

Figure 1:
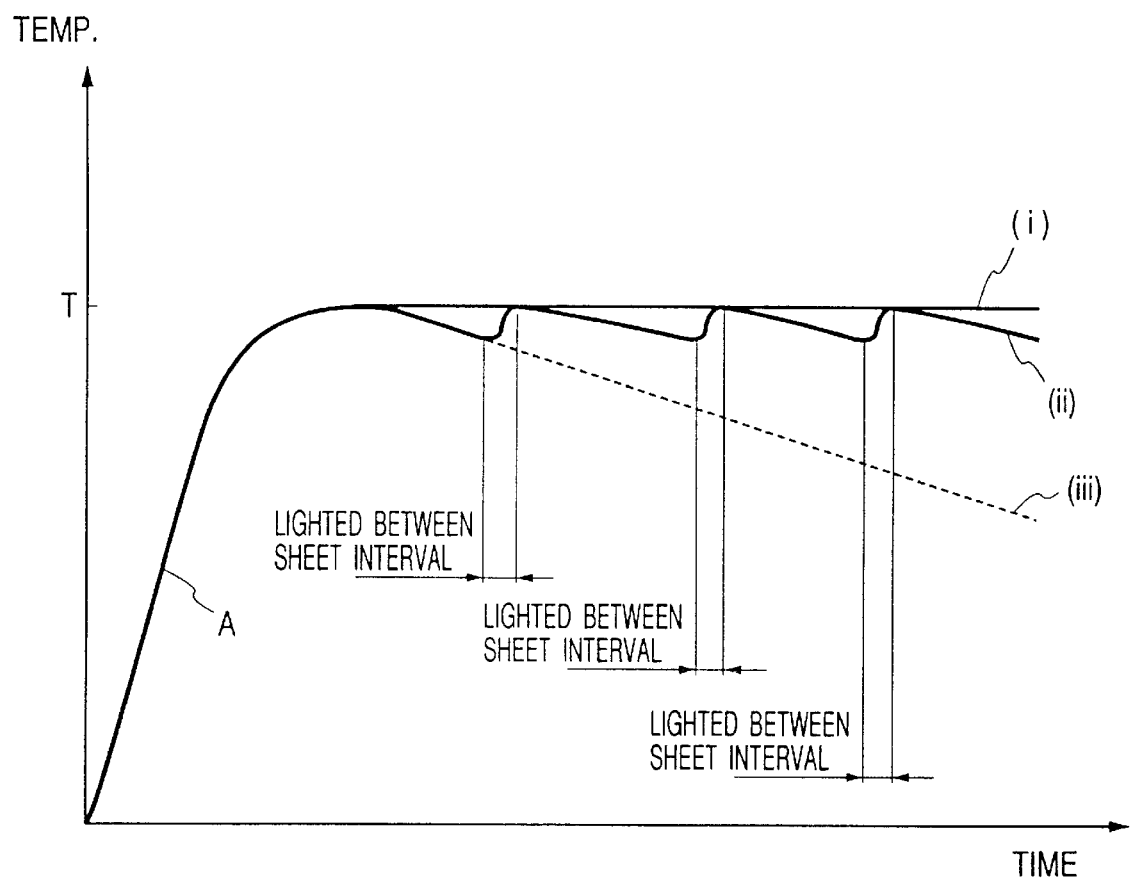
FIG. 1 is a graph showing change in temperature of an LED.

A preferred embodiment of the present invention will be explained with reference to FIGS. 1 and 2.

Figure 2:
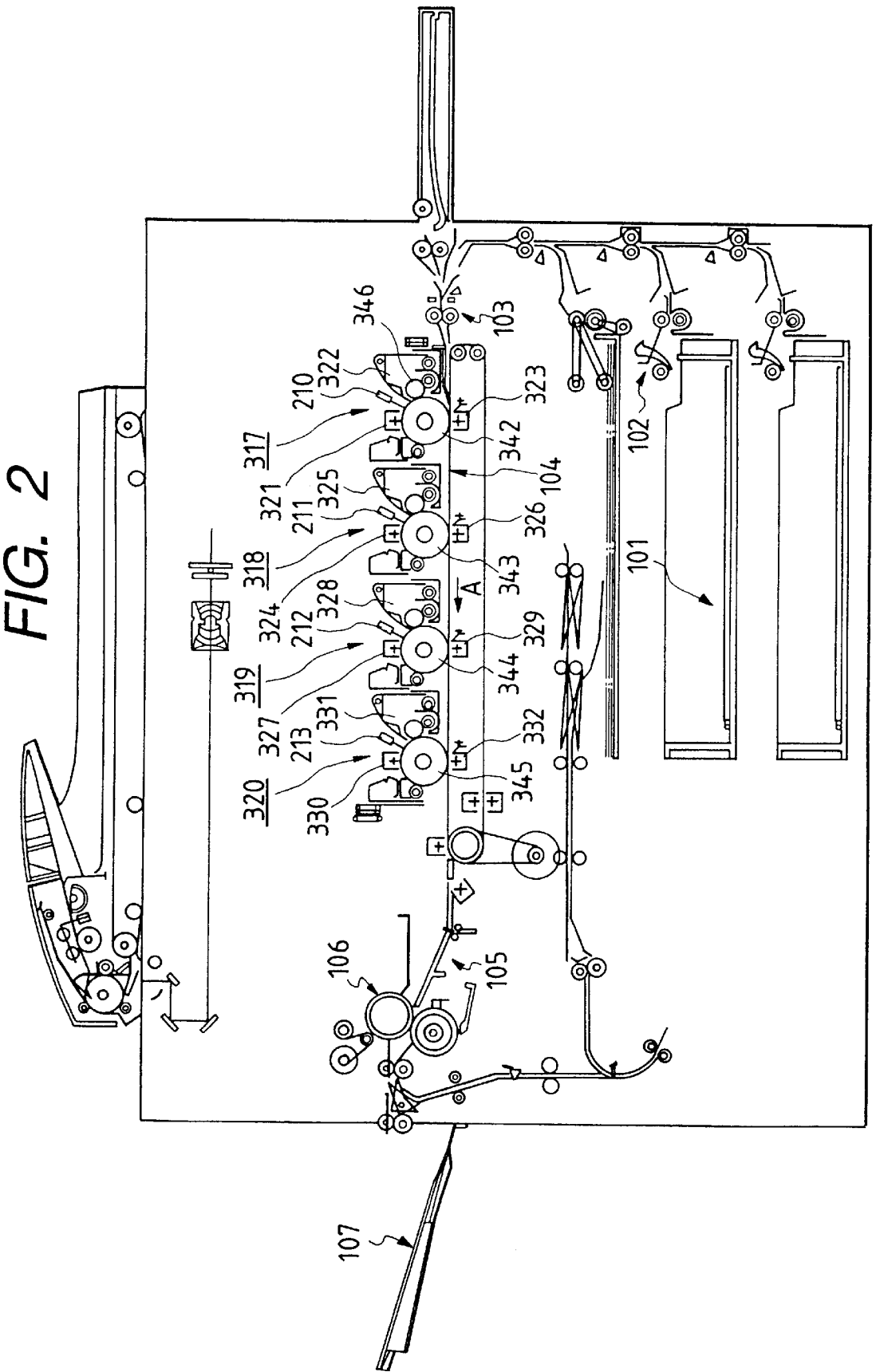
FIG. 2 is a sectional view of a color image forming apparatus according to the present invention.

In FIG. 2 schematically showing a structure of an image forming apparatus according to the present invention, copy sheets P stacked in a sheet cassette 101 are supplied one by one by a sheet supply device 102, and the supplied copy sheet is conveyed to a pair of regist rollers 103. The pair of regist rollers 103 serve to send the copy sheet P to a transfer portion in synchronous with image formation. The copy sheet P is absorbed onto a transfer belt 104 and is moved in a direction shown by the arrow A. While the copy sheet is being moved, an yellow (Y) color image, a magenta (M) color image, a cyan (C) color image and a black (K) color image are successively transferred onto the copy sheet, to thereby form a full-color image on the copy sheet P. When the copy sheet P reaches the left end of the transfer belt 104, the copy sheet is separated from the transfer belt 104, and the separated copy sheet is sent, via a convey guide 105, to a fixing device 106, where the full-color image is fixed to the copy sheet. Thereafter, the copy sheet is discharged onto a discharge tray 107.

Next, image forming portions will be fully described. The reference numeral 317 denotes an yellow image forming portion, 318 denotes a magenta image forming portion, 319 denotes a cyan image forming portion, and 320 denotes a black image forming portion. Since these image forming portion have the same structure, only the yellow image forming portion 317 will be fully explained, and explanation of the other image forming portions will be omitted.

In the yellow image forming portion 317, a latent image is formed on a photosensitive drum 342 by light from an LED array 210. A first charger 321 serves to charge the surface of the photosensitive drum 342 with predetermined potential for preparing the formation of the latent image. A developing device 322 serves to develop the latent image on the photosensitive drum 342 to form a toner image. The developing device 322 includes a sleeve 346 for applying developing bias (for development). A transfer charger 323 serves to apply discharge to a lower (under) surface of the transfer belt 104, thereby transferring the toner image from the photosensitive drum 342 onto the copy sheet P on the transfer belt 104.

The LED array (recording head) 210 includes a plurality of LED chips disposed on a substrate and having a plurality of light emitting elements and is mounted such that the LED chips are arranged along a direction perpendicular to a copy sheet conveying direction. Regarding each light emitting element, it is determined whether it should be lighted or put-off on the basis of image information as an electric signal, and a latent image is formed on the photosensitive drum in correspondence to the lighted light emitting elements.

For example, it is assumed that two stripe images extending to the copy sheet conveying direction as shown in FIGS. 7A and 7B are to be formed. In this case, regarding the light emitting elements on the LED array, the light emitting elements corresponding to the image areas are lighted and the light emitting elements corresponding to non-image areas are put-off. When such images are formed continuously, in the conventional techniques, as shown in FIG. 7B, temperatures of substrate portions where the light emitting elements are lighted are increased, so that only such substrate portions are expanded. Consequently, magnification of the image is changed or positional deviation ($\Delta d1$, $\Delta d2$) occurs. If such a condition is generated in a plurality of LED arrays 210, 211, 212 and 213, color deviation will occur. Further, due to the temperature increase, since light emitting amounts of the light emitting elements are decreased by about –1%/deg, density of image of a first copy will differ from an N-th copy. Further, if a full image is formed on an entire surface of the copy sheet immediately after the N-th copy is completed, there will arise the difference in image density between the local temperature increased portions and the other portions, to thereby cause density unevenness.

To solve the above problem, in the illustrated embodiment, the following procedures are performed. That is to say, first of all, before the image formation is started, all of the light emitting elements of the LED arrays 210 to 213 are lighted uniformly. As a result, temperatures of all of the light emitting elements are increased substantially uniformly. FIG. 1 is a graph showing the temperature increase condition of the light emitting element of the LED array used in the present invention. In this graph, the abscissa indicates a temperature and the ordinate indicates a time. When the light emitting element is lighted, the temperature of the light emitting element is increased due to self temperature increase along the curve A as the time goes on. After the temperature is increased by about 15° C., the temperature of the light emitting element tends to be kept constant (T° C.). In general, in image forming apparatuses such as copying machines, there is a time period of about several seconds to ten-odd seconds from when an operator depresses a start button to when the latent image is formed on the photosensitive member. Within this time period, in order to stabilize the surface potential on the photosensitive member, light is illuminated onto the photosensitive member by LEDs (not shown) not used in the exposure operation or bias is applied to the surface of the photosensitive member from a charger (not shown), to thereby remove electricity. This is referred to as "pre-rotation". By bringing the temperatures of the light emitting elements to about T° C. by lighting the elements during the pre-rotation, even when the light emitting elements are lighted later during the image formation, a range of the temperature increase becomes small (see curve (i)), to thereby prevent occurrence of the above conventional problem.

Figure 8:
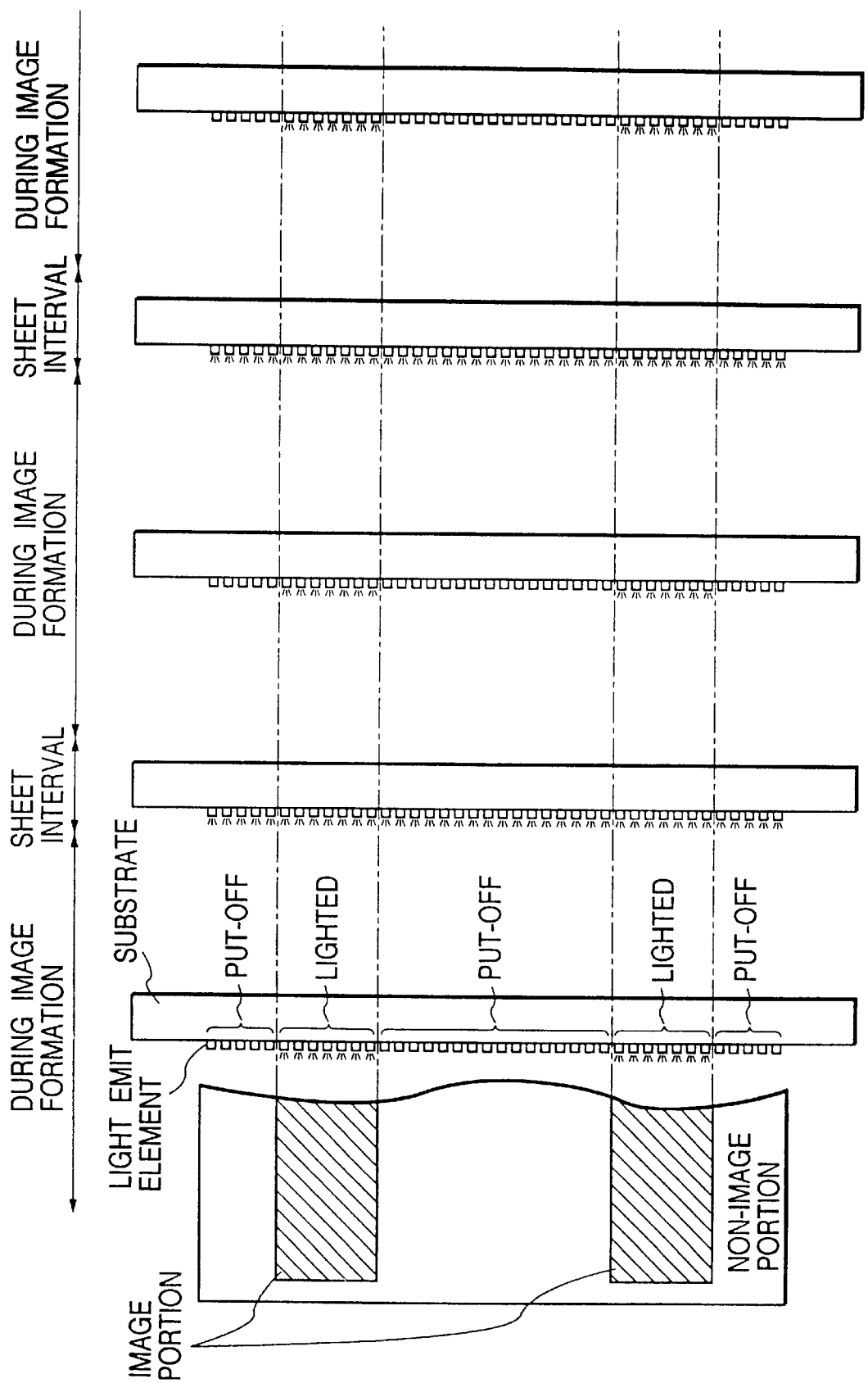
FIG. 8 is an explanatory view showing lighted condition of light emitting elements according to the first embodiment.

However, depending upon a pattern of an image to be formed by the image forming apparatus, there is naturally light emitting elements which are not lighted or put-off. In such a case, the temperatures of the put-off light emitting elements are decreased as shown by the curve (iii), so that there arises the temperature difference between the lighted light emitting element (curve (i)) and the put-off light emitting element (curve (iii)). To avoid this, in the illustrated embodiment, when a plurality of images are formed continuously, all of the light emitting elements of the LED arrays 210 to 213 are lighted uniformly at a timing (sheet interval) between the (N-1)th copy and the N-th copy (FIG. 8). As a result, the temperature of the light emitting elements which are put-off during the image formation (which temperatures were being decreased during the image formation as shown by the curve (ii) in FIG. 1) are increased again by lighting these elements during the sheet interval, with the result that the temperatures of these elements approach about T° C. Thus, the temperatures of all of the light emitting elements are always maintained near T° C. Incidentally, the operation for lighting all of the light emitting elements during the sheet interval may be performed every sheet intervals or intermittent intervals.

In the illustrated embodiment, when the light emitting elements are lighted other than during the image formation (i.e., during the pre-rotation or during the sheet interval), potentials of the developing devices 322, 325, 328 and 331 are controlled with respect to the surface potentials of the photosensitive drums 342, 343, 344 and 345 not to effect development.

Figure 3:
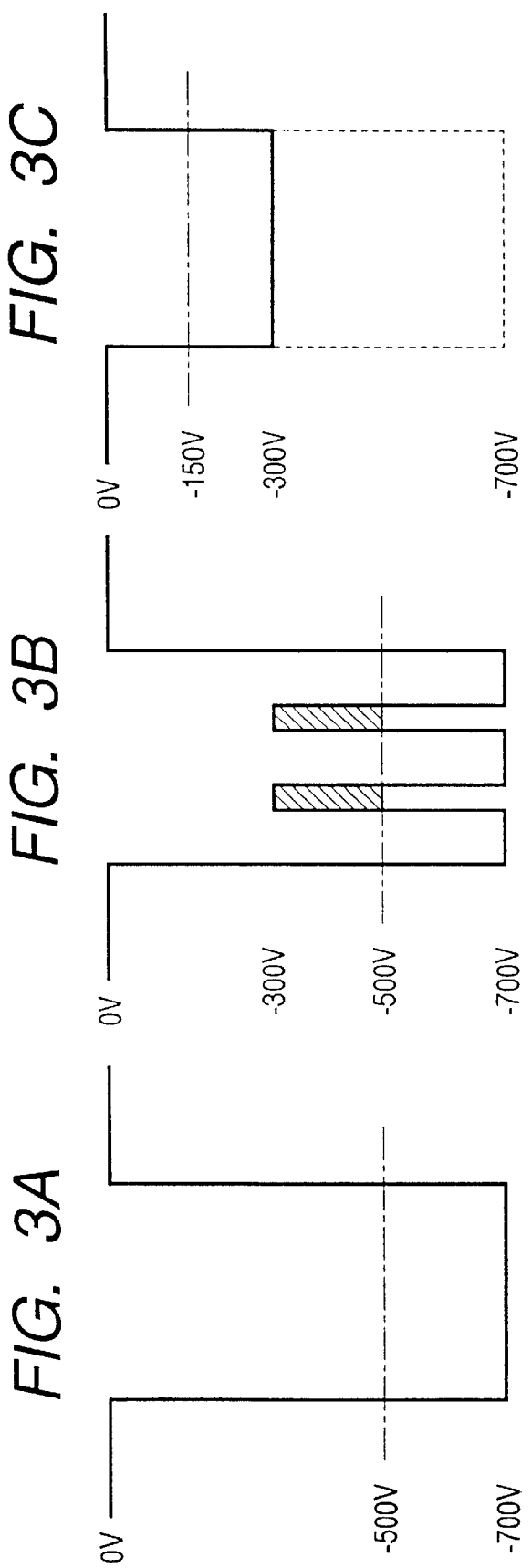
FIGS. 3A, 3B and 3C are explanatory views showing surface potential of a photosensitive drum according to first to third embodiments of the present invention.

In FIGS. 3A to 3C which are explanatory views showing the surface temperature of the photosensitive member, for example, regarding the yellow image forming portion 317, as mentioned above, the surface of the photosensitive drum is charged to −700 V by the first charger 321 (FIG. 3A). Then, when the light emitting elements (on the LED array 210) corresponding to the image portions are lighted in response to image information, the surface potential of portions of the photosensitive drum corresponding to the lighted light emitting elements is increased to −300 V. When it is assumed that developing bias applied to the developing sleeve 346 is set to −500 V, as shown by hatched areas in FIG. 3B, toner to which negative charges are applied is transferred onto only areas having −300 V of the photosensitive drum and is not transferred onto areas having −700 V. In this way, a desired image can be obtained. This is a normal relation between the surface potential of the photosensitive drum and the developing bias during the image formation. In the illustrated embodiment, when the light emitting elements are lighted at the timing other than during the image formation, the developing bias is set as shown in FIG. 3C. That is to say, the entire surface of the photosensitive drum 342 is charged to −300 V by lighting the LED array 210. The developing bias set to −500 V in the normal image formation is changed to, for example, −150 V (a value between −300 V and 0 V of the surface potential of the drum), and the changed developing bias is applied when the light emitting elements are lighted at the timing other than during the image formation. Consequently, the surface of the drum is charged to −300 V, with the result that, even when the latent image is formed, the latent image is not actually developed.

Next, a second embodiment of the present invention will be explained.

Figure 4:
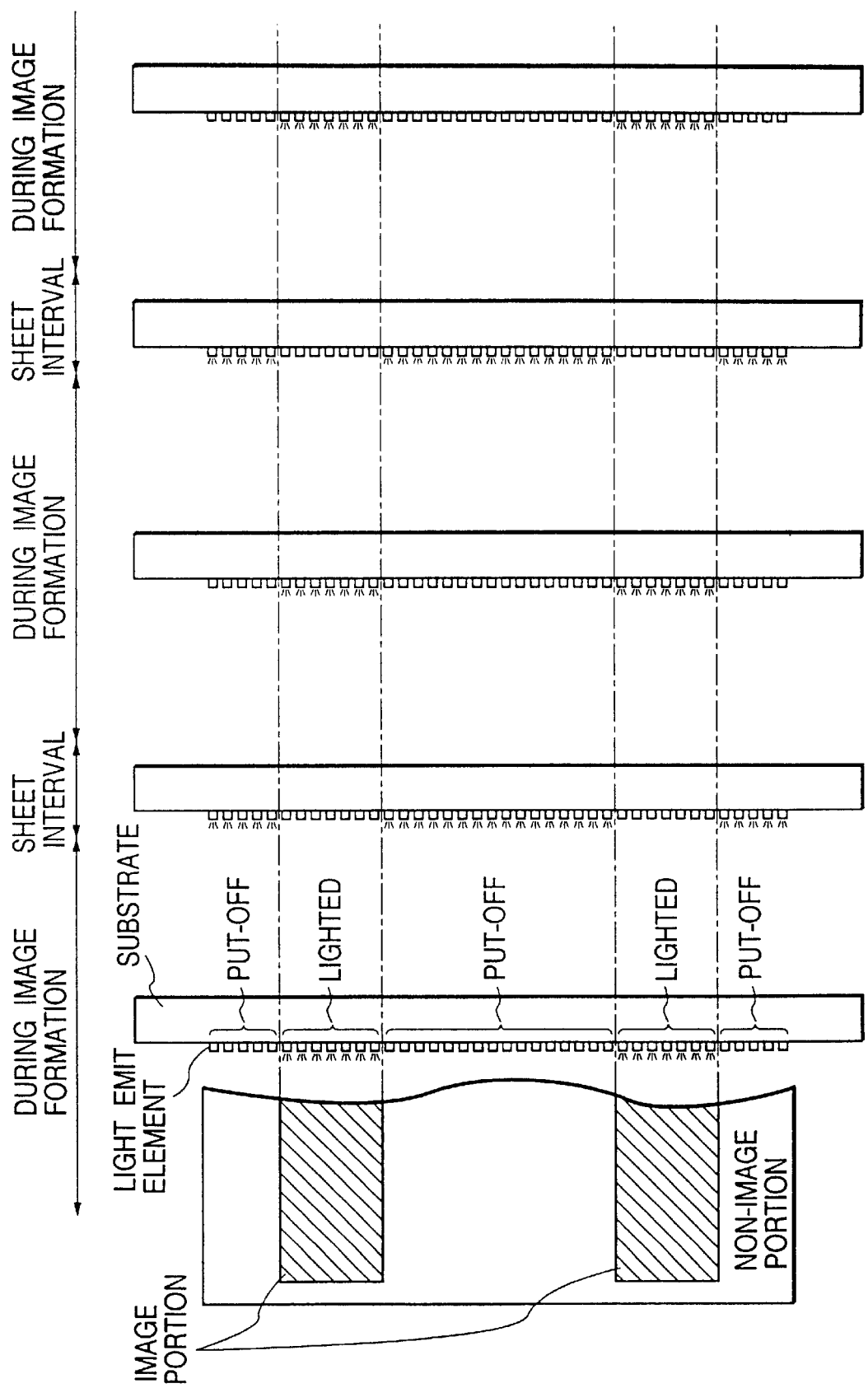
FIG. 4 is an explanatory view showing liquid condition of light emitting elements according to the second embodiment.

In the first embodiment, while an example that all of the exposing light emitting elements are lighted during the sheet intervals was explained, some of the light emitting elements may be selectively lighted (FIG. 4). That is to say, the lighting frequencies that the respective light emitting elements are lighted are calculated on the basis of the image information during the image formation, the light emitting elements having the frequency greater than a predetermined threshold are not lighted during the sheet interval and the light emitting elements having the frequency smaller than the predetermined threshold are lighted during the sheet interval. Since the light emitting elements lighted during the image formation at the lighting frequency greater than the predetermined value have adequate increased temperature, even when such light emitting element are put-off during the sheet interval, the temperatures of such elements are maintained near T° C. On the other hand, since the light emitting elements lighted during the image formation at the lighting frequency smaller than the predetermined value have inadequate temperature, such light emitting elements are lighted during the sheet interval, to thereby approach the temperatures thereof to T° C. In this way, the temperatures of all of the light emitting elements can be maintained near T° C. with less power consumption.

Next, a third embodiment of the present invention will be explained. In the image forming apparatus shown in FIG. 2, for example, when a full-color image is formed immediately after a plurality of black color images were formed continuously, the third embodiment is applied.

In order to form the black image, in the black image forming portion 320, the image formation is effected in the same manner as that in the first embodiment. That is to say, the light emitting elements of the LED array 213 are lighted in response to image information to form a latent image on the photosensitive drum 345 and then the latent image is developed and transferred. On the other hand, the yellow image forming portion 317, magenta image forming portion 318 and cyan image forming portion 319 do not perform the image formation.

Since the black LED array 213 is lighted to effect the image formation, the temperature thereof is increased to approach T° C. Meanwhile, although image information is not sent to the yellow LED array 210, magenta LED array 211 and cyan LED array 212, the exposing light emitting elements of these LED arrays are lighted. Normally, since black color image formation or full-color image formation is selected by an ACS (auto color selection) function prior to the image formation, in case of the black color image formation, all of the light emitting elements are lighted in a condition that the image formation (development, image transferring) is not performed in the yellow, magenta and cyan image forming portions 317, 318 and 319. As a result, the temperatures of the yellow, magenta and cyan LED arrays 210, 211 and 212 are also increased to the same extent as the black LED array 213 to approach T° C.

Accordingly, even when the full-color image is formed immediately after the black color image was formed, since the temperatures of all of the yellow, magenta, cyan and black LED arrays 210 to 213 are increased substantially uniformly, color deviation and density unevenness due to the difference in thermal expansion can be prevented. By adopting the third embodiment together with the first or second embodiment, more excellent advantages can be achieved.

Figure 5B:
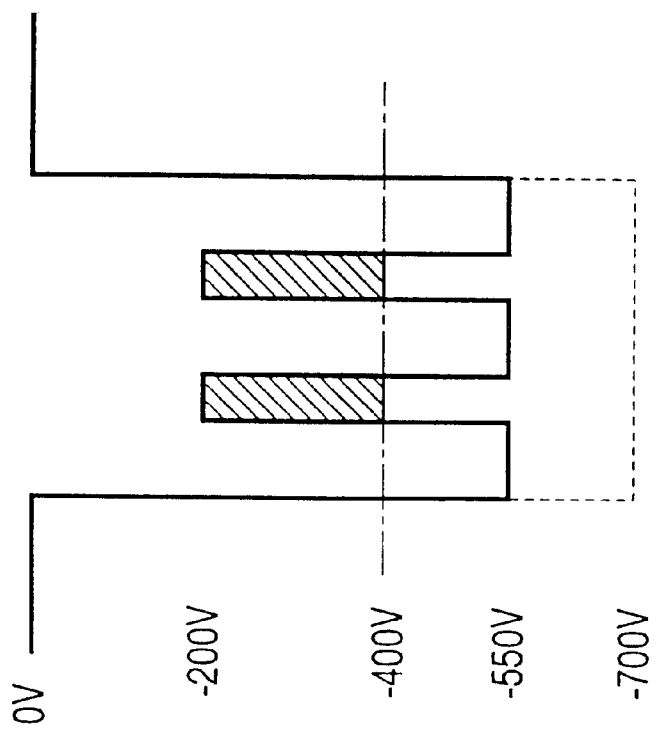
FIGS. 5A and 5B are explanatory views showing surface potential of a photosensitive drum according to a fourth embodiment of the present invention.

Next, a fourth embodiment of the present invention will be explained with reference to FIGS. 5A and 5B.

Figure 5A:
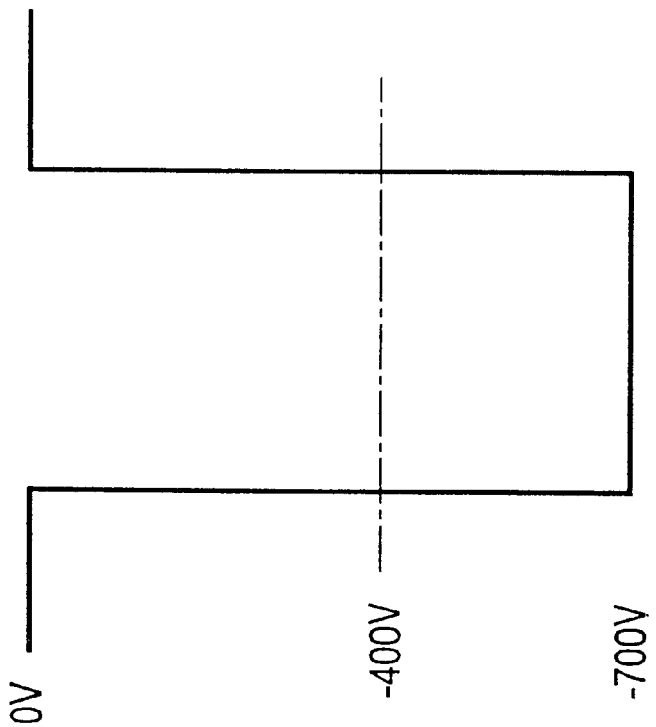

According to this embodiment, in a first step of the image formation, the surface of the photosensitive drum 342 is charged to, for example, −700 V by the action of the first charger 321 of the image forming apparatus (FIG. 5A).

Figure 6A:
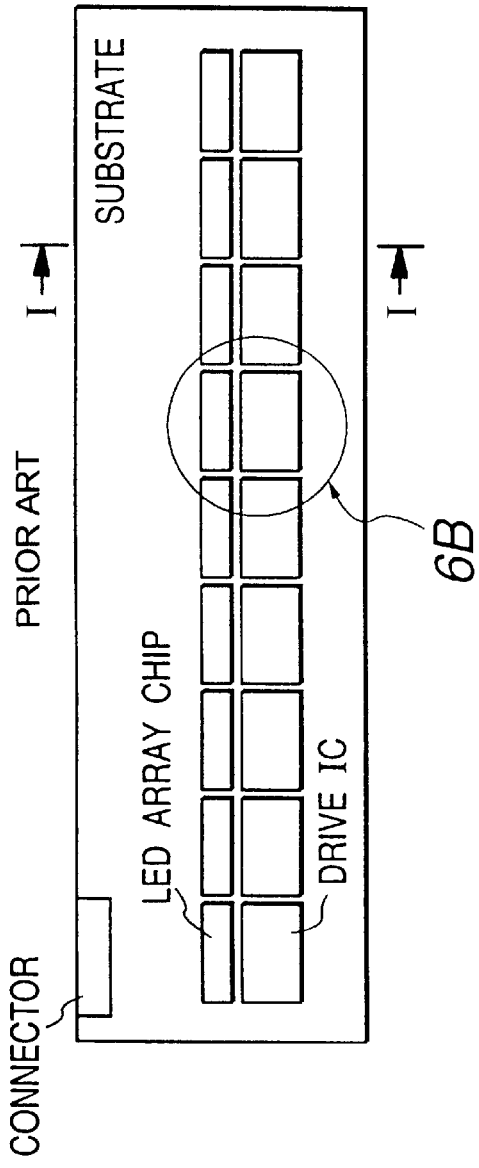
FIGS. 6A, 6B and 6C are views showing a structure of a recording head (FIG. 6B is an enlarged view of a portion of FIG. 6A, and FIG. 6C is a sectional view of FIG. 6A along line 1)
Figure 6B:
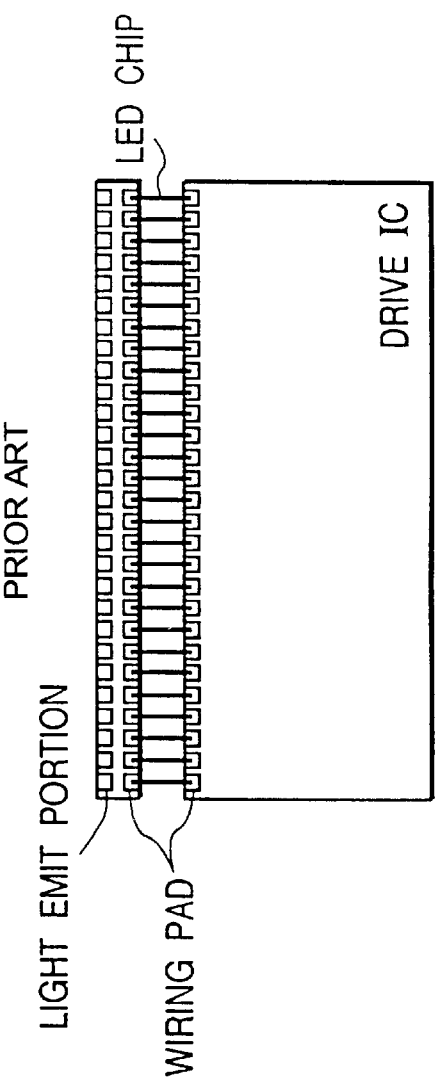
Figure 6C:
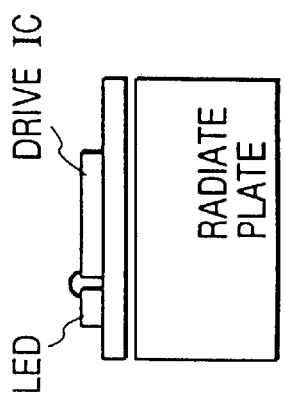

Then, when the light emitting elements (on the LED array 210) corresponding to the image portions are lighted in response to image information, the surface potential of portions of the photosensitive drum corresponding to the lighted light emitting elements is increased to −200 V. On the other hand, the light emitting elements corresponding to the non-image portions are also lighted with smaller light amount. More specifically, low current or voltage may be applied to the latter light emitting elements by the drive IC connected to the LED chip shown in FIGS. 6A to 6C. In this way, the surface of portions of the photosensitive drum corresponding to the light emitting elements lighted with smaller light amount is charged to, for example, −550 V. When the developing bias is set to −400 V for example (a value between −200 V of the surface potential of the drum charged by the light emitting elements with the normal light amount and −550 V of the surface potential of the drum charged by the light emitting elements with small light amount), as shown by hatched areas in FIG. 5B, only the portions of the photosensitive drum having the surface potential of −200 V are developed. In this way, a desired image can be obtained. In this embodiment, since the light emitting elements corresponding to the non-image portions are also lighted (with smaller light amount), the reduction of temperatures of such light emitting elements can be suppressed, to thereby maintain the temperatures near T° C.

As mentioned above, according to the present invention, by controlling the light emitting elements of the recording head such that the light emitting elements are lighted at the timing other than during the image formation or the light emitting elements not contributing to the image formation are lighted with smaller light amount, the temperatures of all of the light emitting elements can be kept constant, and, thus, the change in magnification, color deviation, density fluctuation and density unevenness can be prevented, and the apparatus can be made cheaper and compact.

The present invention is not limited to the above-mentioned embodiments, but various alterations and modifications can be made within the scope of the invention.

What is claimed is:

1. An image forming apparatus comprising:
    a photosensitive body;
    a charger for charging said photosensitive body;
    a recording head including a plurality of light emitting elements for emitting light in accordance with an image signal for forming an electrostatic image on said photosensitive body by exposing said photosensitive body that is charged by said charger;
    a recording head controller for controlling the plurality of light emitting elements;
    a developer for developing the electrostatic image with toner charged to a same polarity as that of the electrostatic image; and
    a developer controller for controlling a developing condition of said developer,
    wherein said recording head controller controls all of the plurality of light emitting elements to emit light in timing with an area of said photosensitive body charged by said charger after a start of an operation for image formation and before forming the electrostatic image on said photosensitive body, and said developer controller controls the developing condition of said developer to not develop the area of said photosensitive body exposed by the plurality of light emitting elements prior to forming the electrostatic image.

2. An image forming apparatus according to claim 1, wherein said developer controller changes a bias voltage applied to said developer when said developer is opposite non-image areas of said photosensitive body exposed by the plurality of light emitting elements.

3. An image forming apparatus according to claim 1, wherein said image forming apparatus is capable of continuous image formation and the plurality of light emitting elements are controlled to emit light between images in the continuous image formation.

4. An image forming apparatus according to claim 3, wherein the plurality of light emitting elements are controlled to emit light between image formation of a predetermined number of images.

5. An image forming apparatus according to any one of claims 1 to 4, said image forming apparatus further comprising a plurality of said photosensitive bodies and a plurality of said recording heads corresponding respectively to a plurality of colors for forming an image having the plurality of colors on a recording medium.

* * * * *

UNITED STATES PATENT AND TRADEMARK OFFICE
CERTIFICATE OF CORRECTION

PATENT NO.    : 6,545,692 B1
DATED         : April 8, 2003
INVENTOR(S)   : Tatsuya Gota It is certified that error appears in the above-identified patent and that said Letters Patent is hereby corrected as shown below:

<u>Title page,</u>
Item [56], FOREIGN PATENT DOCUMENTS,
"10016293 * 1/1988" should read -- 10-016293 * 1/1998 --; and
"01222274" should read -- 1-222274 --.
Item [57], ABSTRACT,
Line 5, "ray" should read -- array --.

<u>Column 2,</u>
Line 62, "line 1);" should read -- line I); --.

<u>Column 3,</u>
Line 11, "synchronous" should read -- synchronism --.

Signed and Sealed this

Eighteenth Day of November, 2003

JAMES E. ROGAN
*Director of the United States Patent and Trademark Office*